(12) United States Patent
Celi, Jr. et al.

(10) Patent No.: US 7,493,284 B2
(45) Date of Patent: Feb. 17, 2009

(54) USING VISUAL IMAGES TRANSFERRED FROM WIRELESS COMPUTING DEVICE DISPLAY SCREENS

(75) Inventors: Joseph Celi, Jr., Boca Raton, FL (US); Thomas E. Creamer, Boca Raton, FL (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 10/324,522

(22) Filed: Dec. 19, 2002

(65) Prior Publication Data

US 2004/0122737 A1    Jun. 24, 2004

(51) Int. Cl.
*G06Q 40/00*    (2006.01)
*G06Q 20/00*    (2006.01)
*G06Q 30/00*    (2006.01)
*H06K 1/00*    (2006.01)
*H04L 9/00*    (2006.01)
*G06K 7/10*    (2006.01)

(52) U.S. Cl. ............... 705/39; 705/44; 705/16; 705/26; 705/75; 235/462

(58) Field of Classification Search .......... 705/26; 455/406
See application file for complete search history.

(56) References Cited

U.S. PATENT DOCUMENTS

| | | | | |
|---|---|---|---|---|
| 5,903,878 A | * | 5/1999 | Talati et al. | 705/26 |
| 5,930,767 A | * | 7/1999 | Reber et al. | 705/26 |
| 6,026,375 A | * | 2/2000 | Hall et al. | 705/26 |
| 6,027,024 A | | 2/2000 | Knowles | 235/472.01 |
| 6,177,683 B1 | | 1/2001 | Kolesar et al. | 250/566 |
| 6,193,161 B1 | | 2/2001 | Sojka et al. | 235/472.01 |

(Continued)

FOREIGN PATENT DOCUMENTS

EP    1341327 A1 *    6/2002

(Continued)

OTHER PUBLICATIONS http://web.archive.org/web/20010211175624/http://www.taltech.com/TALtech_web/resources/intro_to_bc/bcompscr.htm.*

(Continued)

*Primary Examiner*—F. Zeender
*Assistant Examiner*—Mussa Shaawat
(74) *Attorney, Agent, or Firm*—Akerman Senterfitt

(57) ABSTRACT

Within a wireless computing device, a method of conducting commerce can include receiving a user input in the wireless computing device specifying an account to which a proposed transaction is to be billed and identifying contact information for a billing entity according to the user specified account. The billing entity can manage the account. An authorization can be requested from the billing entity via a wireless communications link established using the contact information. The method also can include receiving the authorization from the billing entity via the wireless communications link, generating a visual image which identifies the billing entity and represents the authorization received from the billing entity, and presenting the visual image upon the display screen of the wireless computing device. Accordingly, a visual image reader can read the displayed visual image.

6 Claims, 2 Drawing Sheets

U.S. PATENT DOCUMENTS

| | | | |
|---|---|---|---|
| 6,223,291 B1 * | 4/2001 | Puhl et al. | 726/28 |
| 6,226,495 B1 * | 5/2001 | Neustein | 340/311.2 |
| 6,230,970 B1 | 5/2001 | Walsh et al. | 235/379 |
| 6,305,603 B1 | 10/2001 | Grunbok, Jr. et al. | 235/379 |
| 6,345,764 B1 | 2/2002 | Knowles | 235/472.01 |
| 6,463,534 B1 * | 10/2002 | Geiger et al. | 713/168 |
| 6,736,322 B2 | 5/2004 | Gobburu et al. | 235/462.46 |
| 7,167,711 B1 * | 1/2007 | Dennis | 455/456.1 |
| 7,184,747 B2 * | 2/2007 | Bogat | 455/406 |
| 7,200,566 B1 * | 4/2007 | Moore et al. | 705/26 |
| 7,209,903 B1 * | 4/2007 | Mamdani et al. | 705/75 |
| 7,240,036 B1 * | 7/2007 | Mamdani et al. | 705/75 |
| 7,292,996 B2 * | 11/2007 | Nobrega et al. | 705/39 |
| 2001/0034717 A1 | 10/2001 | Whitworth | 705/64 |
| 2001/0044324 A1 | 11/2001 | Carayiannis et al. | 455/564 |
| 2001/0051915 A1 * | 12/2001 | Ueno et al. | 705/39 |
| 2002/0023027 A1 | 2/2002 | Simonds | 705/26 |
| 2002/0091569 A1 * | 7/2002 | Kitaura et al. | 705/14 |
| 2002/0107791 A1 * | 8/2002 | Nobrega et al. | 705/39 |
| 2002/0169984 A1 * | 11/2002 | Kumar et al. | 713/201 |
| 2003/0058261 A1 * | 3/2003 | Challa et al. | 345/690 |
| 2004/0054624 A1 * | 3/2004 | Guan et al. | 705/40 |
| 2007/0109262 A1 * | 5/2007 | Oshima et al. | 345/156 |

FOREIGN PATENT DOCUMENTS

| | | | |
|---|---|---|---|
| GB | 2293475 | | 3/1996 |
| JP | 7195752 | | 8/1995 |
| JP | 2001-325468 | | 11/2001 |
| WO | WO83/00251 | | 1/1983 |
| WO | WO 97/45814 | * | 5/1997 |

OTHER PUBLICATIONS

"Japan's Ana to Launch Wireless Convence Store Payment System", Jul. 8, 2002; Copyright 2002 Asia Pulse; AsiaPulse News, p. 2584, Dialog article # 0476536404 15vt13km.*

P. Agrawal, et al., A Testbed for Mobile Networked Computing, *Communications—Gateway to Globalization; 1995 IEEE Intl'l Conf on Communications*, Seattle, vol. 1, pp. 410-416, (1995).

L. Asböck, New Ideas With New Computers: The Epson Handy Terminals, *Mikro-und Kleincomputer*, vol. 9, No. 6, pp. 17-20, (Dec. 1987).

M. Anger, TRS 80 Model 100: A "New Look" Portable, *Micro Systemes*, Issue 37, pp. 86-91, (Dec. 1983).

B. D. Rauch, *Wearable Computers*, <http://eies.njit.edu/~turoff/coursenotes/CIS732/samplepro/brian_732.htm>, (Dec. 16, 1999).

J. Rekimoto, et al., The World Through The Computer: Computer Augmented Interaction With Real World Environments, *UIST '95*, pp. 29-36, (Nov. 14-17, 1995).

R. Kumar, Internet Appliance Solutions: The Pocket Partner, *Accelent Systems, Inc.*, (2001).

K. Matsumoto, et al., Area Control System Via Bar Code (2nd Dimension) Displayed on Cellular or Other Mobile Terminal (Like Workpad), *IBM Technical Data Bulletin*, No. 454, Art. 126, pp. 294 (Feb. 2002).

* cited by examiner

USING VISUAL IMAGES TRANSFERRED FROM WIRELESS COMPUTING DEVICE DISPLAY SCREENS

BACKGROUND OF THE INVENTION

1. Technical Field

The invention relates to the field of wireless computing devices and, more particularly, to using a wireless computing device to perform financial transactions.

2. Description of the Related Art

Bar codes are used to represent information in a manner that can be easily and automatically read by machines referred to as bar code readers. Accordingly, bar codes are utilized for a variety of different purposes which range from tracking and identifying inventory items to identifying persons. Bar codes can be implemented as single dimension bar codes or as multidimensional bar codes.

Bar codes need not be printed on paper or other conventional surfaces. For example, bar codes can be displayed upon display devices such as liquid crystal displays (LCD). LCDs operate by altering the polarity of portions of the screen to allow light to pass through thereby producing areas of contrast on the LCD. Thus, a bar code can be displayed upon the LCD and can be read by a bar code reader.

Conventional devices such as electronic wallets having displays incorporated therein can be programmed to display bar codes upon the display screen of the device. These devices can be programmed to store and display any of several different bar codes which correspond to identification cards the user typically carries on his or her person. Because the electronic wallet can display a given bar code responsive to a user request, the user need not carry the various individual cards if the bar code from the card is stored within the electronic wallet.

Still, such devices are limited to displaying only preprogrammed bar codes which are representative of various other user accounts.

SUMMARY OF THE INVENTION

The present invention provides a method and apparatus for conducting commerce with a wireless computing device. More particularly, the present invention allows a user to command a wireless computing device to request authorization from a billing entity to charge a particular transaction to an account associated with or managed by that billing entity. A response received from the billing entity can be provided to a merchant via a bar code which can be dynamically determined by the wireless computing device. The bar code can be displayed upon a display screen of the wireless computing device. The authorization also can be transferred to the merchant using a short range wireless communications link. In any case, the merchant then can contact the billing entity to verify or confirm authorization to complete the transaction.

The present invention can provide enhanced security over conventional methods of conducting commerce. For example, according to one embodiment, the merchant need not have knowledge of the user's account number. Rather, the merchant can contact a billing entity using the authorization number as a reference which correlates with the proposed transaction, the user account, and the account owner. In another embodiment, an application executing on the wireless computing device can require user verification and authentication procedures such as user entered passwords or some other type of user identification such as a voice match, finger print, or some other form of biometric information from the user before a request for a potential transaction can be initiated. In addition, the present invention provides the billing entity with an opportunity to review credit limits on a per transaction basis, as well as negotiate new or revised credit limits through communications with the user via the user's wireless computing device on a per transaction basis.

One aspect of the present invention can include a method of conducting commerce which can be performed within a wireless computing device. The method can include receiving a user input in the wireless computing device specifying an account to which a proposed transaction is to be billed. The user input also can specify the billing entity and/or an amount of the proposed transaction. Contact information for the billing entity can be determined based upon to the user specified account. For example, the contact information can be associated with the account and can be stored within the device or located in a network accessible data store. The billing entity can be charged with managing the account and providing authorizations to charge the account.

Authorization to charge the account can be requested from the billing entity via a wireless communications link established using the contact information for the billing entity. For example, the wireless communications link can be a data communication link or can be a voice communications link. If the authorization is requested using a voice communications link, the requesting step can include calling the billing entity and requesting the authorization over the voice communications link.

The method also can include receiving the authorization from the billing entity via the wireless communications link and dynamically generating a visual image which can identify the billing entity and represent the authorization received from the billing entity. Accordingly, the visual image can be presented upon the display screen of the wireless computing device such that a visual image reader can read the displayed visual image.

Once the visual image is presented upon the display screen of the wireless computing device, a visual image reader which can be incorporated within a merchant information processing system can be used to read the visual image. The merchant information processing system can determine the authorization and the billing entity from the visual image. Accordingly, the contact information for the billing entity can be identified whether determined from the visual image itself or from accessing a data store having contact information which can be matched to the billing entity information determined from the visual image. The merchant information processing system can send the authorization to the billing entity and subsequently receive a response from the billing entity indicating whether the proposed transaction was accepted.

Another aspect of the present invention can include receiving a user input in the wireless computing device specifying an account to which a proposed transaction is to be billed and determining contact information for a billing entity according to the user specified account. The billing entity can be charged with managing the account. An authorization can be requested from the billing entity via a wireless communications link established using the contact information. The authorization can be received from the billing entity via the wireless communications link. The authorization and information identifying the billing entity can be sent to a merchant information processing system through a short range wireless communications link.

Accordingly, the merchant information processing system can receive the authorization and information identifying the billing entity. The merchant information processing system can identify contact information for the billing entity whether received from the wireless computing device or determined from a data store accessible to the merchant information processing system. The merchant information processing system can send the authorization to the billing entity and subsequently receive a response from the billing entity indicating whether the proposed transaction was accepted.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The present invention provides a method and apparatus for conducting commerce using a wireless computing device. More particularly, the present invention allows a user to command a wireless computing device to request authorization from a billing entity to charge a particular transaction to an account associated with that billing entity. A response received from the billing entity can be provided to a merchant via a bar code which can be displayed upon the wireless computing device or can be transferred to the merchant using a short range wireless communications link. Subsequently, the merchant can contact the billing entity to verify or confirm authorization to complete the proposed transaction.

Figure 1:
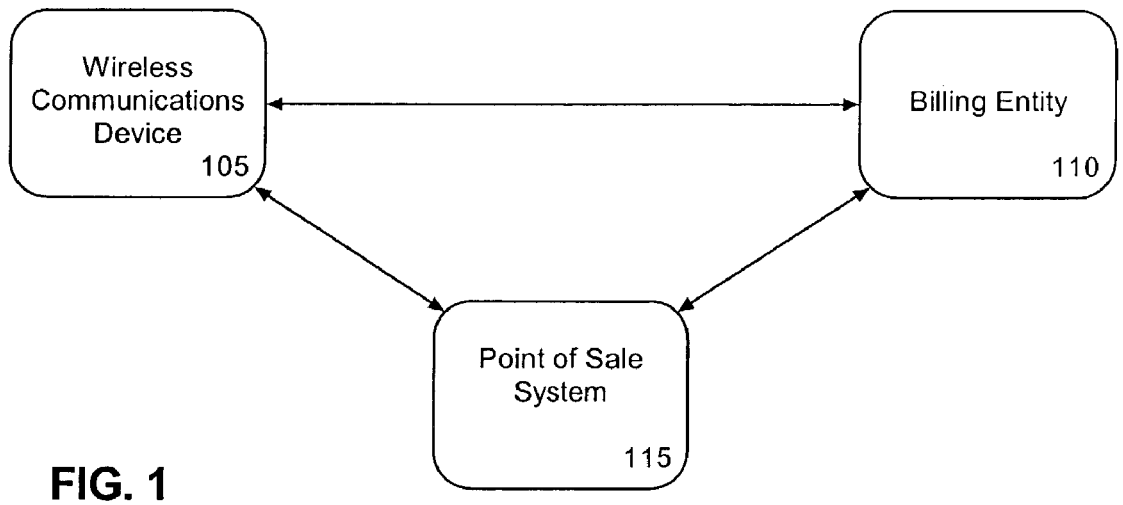
FIG. 1 is a schematic diagram illustrating a system for performing a financial transaction in accordance with the present invention.

FIG. 1 is a schematic diagram illustrating a system 100 for performing financial transactions in accordance with the present invention. As shown in FIG. 1, the system 100 can include a wireless computing device 105, a billing entity 110, and a point of sale (POS) system 115. A wireless communications network (not shown) can serve to communicatively link the wireless communications device 105 and the billing entity 110. Although the POS system 115 and the billing entity 110 also can be communicatively linked via the wireless communications network, the POS system 115 and the billing entity 110 can communicate via a wired communications network as well. The wireless computing device 105 and the POS system 115 can communicate via short range wireless communications or via a bar code reader.

The wireless computing device 105 can be a portable computing device that can communicate over a wireless communications network, whether using a data communication channel or a voice communications channel. Accordingly, exemplary wireless computing devices 105 can include, but are not limited to, cellular or wireless telephones, hand-held computing devices or personal digital assistants having wireless communications capability, as well as portable computers.

In one embodiment of the present invention, the wireless computing device 105 can include a display screen such as a liquid crystal display (LCD) screen which can be used to display bar codes. In another embodiment, in addition to having a wireless transceiver capable of conducting long range wireless communications such as cellular telephone calls or wirelessly accessing the Internet and/or the Web, the wireless computing device 105 can include a wireless transceiver configured to conduct short range wireless communications. For example, the wireless computing device 105 can be Bluetooth-enabled or be configured to communicate using any other appropriate short range wireless communications protocol such as a wireless communications protocol selected from the 802.11 family of protocols.

In any case, the wireless computing device 105 can include an application program configured to conduct financial transactions. Accordingly, the wireless computing device 105 can store account information relating to billing accounts. The account information can specify account numbers, information which can uniquely identify a user of the wireless computing device 105 (the account owner or authorized user of the account), as well as information specifying the manner in which the billing entity 110 which manages the account can be contacted. Notably, such information also can be located on a remote data store which can be accessed by the wireless computing device 105.

The billing entity 110 can be any organization which manages accounts, whether bank accounts, credit card accounts, other financial accounts, and the like. Accordingly, the billing entity 110 can be equipped with information processing systems which can receive wireless communications from the wireless computing device 105 as well as merchant equipment for verifying and authorizing transactions. The billing entity 110 also can include communications equipment for communicating via wired communications networks such as the Internet, the Web, and/or the public switched telephone network (PSTN).

The POS system 115 can be located on premises at a merchant site. The POS system 115 can be integrated into a larger information processing system which can communicate with the billing entity, whether via a wireless communications link or a wired communications link. The POS system 115 can be equipped with a bar code reader and/or a short range wireless transceiver such as a Bluetooth-enabled transceiver for communicating with the wireless computing device 105.

Figure 2:
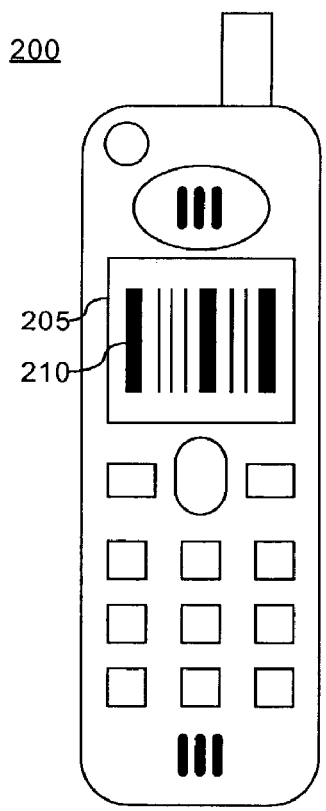
FIG. 2 is a schematic diagram illustrating a wireless computing device in accordance with the present invention.

FIG. 2 is a schematic diagram illustrating an exemplary wireless computing device 200 in accordance with the present invention. The wireless computing device 200 represents a cellular telephone configured in accordance with the inventive arrangements disclosed herein. The wireless computing device 200 can include a display 205, for example an LCD, which can display a bar code 210. Notably, the wireless computing device 200 can be programmed to display single dimension bar codes as well as multidimensional bar codes. As noted, the wireless computing device 200 is not limited to a cellular telephone, but rather can include any portable computing device having wireless communications capabilities as well as a display screen capable of presenting bar codes. As noted, according to one embodiment of the present invention, the wireless computing device 200 can include a short range wireless transceiver.

The term "bar code" as used herein, can include any of a variety of graphic symbols or visual images. The bar code can be formed from an ordering of spaced vertical bars, wherein both the thickness of the bars and the amount of space between the bars can vary. The arrangement of bars and spacing specifies encoded information. For example, the bar code can be a conventional low, medium, or high density bar code. The bar code, however, also can be a single dimension, dual dimension and/or multidimensional bar code. Still, the bar code need not be formed of bars and spaces at all, but rather any image which can be read or interpreted using scanning technology capable of detecting visually detectable patterns, for example as is typically utilized in "bar code"

reading devices or scanners. Although a variety of existing bar code encoding standards exist, a bar code can specify information, whether numbers, characters, and/or symbols, using any protocol which both the bar code reader, and decoder if separate from the bar code reader, and the bar code generating device have been configured or programmed to implement.

Figure 3:
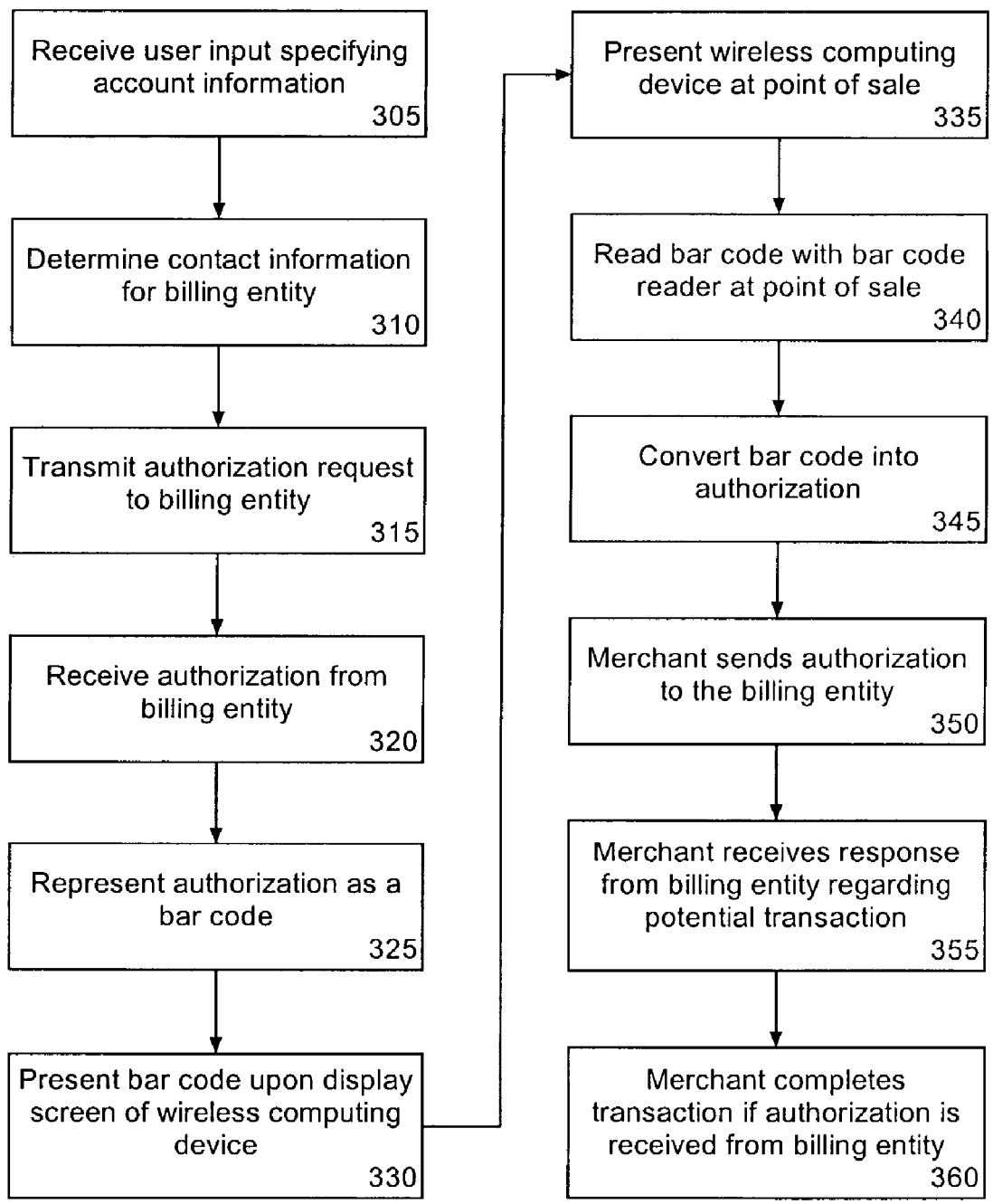
FIG. 3 is a flow chart illustrating a method of conducting financial transactions using a wireless computing device in accordance with the present invention.

FIG. 3 is a flow chart illustrating a method of conducting financial transactions using a wireless computing device in accordance with the present invention. The method 300 can begin in a state wherein the wireless computing device is awaiting a user input requesting that a financial transaction be initiated. For example, the wireless computing device can be programmed to launch an application program upon receiving a particular input, or can be executing an application program as a background process. In any case, in step 305 a user input specifying account information can be received from a user of the wireless computing device. For example, the wireless computing device can be voice-enabled such that the user can speak into the wireless computing device. Still, the user can activate one or more keys to specify commands or passwords, or use a pointing device, for example in the case of a personal digital assistant. Thus, the account information can be specified by the user by keying, speaking, or pointing to an identifier which is associated with the account in the memory of the wireless computing device.

In addition to specifying account information, the user input also can specify an amount for which authorization is being sought in connection with the account and proposed transaction. For instance, while at a check out counter, a user can initiate a request to the wireless computing device which specifies a designated account as well as an amount to be billed. In one embodiment, the application program executing within the wireless computing device can query the user for the amount once the user initiates the financial transaction. As noted, to gain access to the wireless computing device or the financial application within the wireless computing device, the user may be required to provide identifying information such as passwords and/or biometric information.

In step 310, the wireless computing device can access a memory store, which can be included within the wireless device or can be accessible over a communications network, which includes account information for the user. For example, the data store can include a listing of the user's accounts, contact information for the billing entity associated with each listed account, as well as the associations of potential user inputs such as icons, codes, audio, and/or symbols which the application program executing in the wireless computing device uses to represent the various accounts.

Accordingly, using the user input, the contact information for the billing entity associated with the user selected account can be retrieved from memory. The retrieved account information can specify a network address for establishing communications with the billing entity via a data communications link. Alternatively, the account information can specify a telephone number which can be dialed to contact the billing entity to establish an audio or voice channel over which data can be exchanged between the wireless computing device and the billing entity.

In step 315, the wireless computing device can send an authorization request to the billing entity associated with the user selected account. The authorization request can identify the requesting user, the amount to be approved for the transaction, as well as the particular account to be billed. In one embodiment, the wireless computing device can construct a query to be sent over a wireless data communications channel. Such a query can be sent using Wireless Application Protocol (WAP), Short Message Service (SMS), or another suitable wireless communications protocol. In another embodiment, however, the wireless communications device can dial a telephone number for the billing entity and, using a modem, transmit the authorization request over an established wireless voice channel.

The billing entity, having received the authorization request, can access the user's account records and determine whether to approve or reject the authorization request. Accordingly, the billing entity can send an authorization to the requesting wireless computing device. The authorization can be a password or code which is linked to the proposed transaction. In step 320, the wireless computing device can receive the authorization from the billing entity. The authorization can directly or indirectly specify information such as the identity of the requesting user, the account to be charged, the billing entity, and/or contact information for the billing entity.

In step 325, the wireless computing device can represent the received authorization as a bar code. More particularly, the commerce application executing within the wireless computing device can be configured to encode received authorizations from billing entities as bar codes using a predetermined bar coding format or schema. The bar codes can be dynamically generated by the wireless computing device using the predetermined bar code generation protocol. Thus, the bar code representation of the authorization code can be presented upon the display screen of the wireless computing device in step 330.

In step 335, the user of the wireless computing device can present the device at a point of sale. More particularly, the user can place the device within the scanning range of a bar code reader. In step 340, the bar code reader can read or scan the display screen of the wireless computing device to read the bar code. The point of sale system, or another back-end data processing system of the merchant, can translate the bar code into the authorization code that was initially received by the wireless computing device in step 345.

Accordingly, in step 350 the merchant can send the authorization code to the billing entity. Notably, the bar code can include contact information specifying the manner in which the merchant can contact the billing entity for approval of the proposed transaction. For example, the bar code can specify a network address or a telephone number over which the merchant can communicate with the billing entity to obtain approval. In another embodiment, the bar code need only specify the particular billing entity in addition to an authorization code. In that case, the billing entity can maintain or access a data store with contact information corresponding to the billing entity specified within the bar code. Still, depending upon the particular embodiment of the invention, the merchant can submit the amount to be billed to the user account as an additional parameter of the proposed transaction.

The billing entity can match parameters of the merchant's request with parameters of the previously received user request to verify and initiate the potential transaction. The billing entity can send a response indicating whether the potential transaction was approved. In step 355, the merchant can receive the response from the billing entity. If the potential transaction is approved, then in step 360, the potential transaction can be completed. If the potential transaction is not approved, the method can end without completing the sale or transaction.

The present invention provides a solution for conducting commerce with wireless computing devices. Still, other embodiments beyond those described herein with reference to the figures are within the scope of the present invention. For example, in one embodiment, the user request to initiate a potential transaction need not specify an amount, but only inform the billing entity that an authorization request from a merchant will be forthcoming. Accordingly, the merchant request can provide the amount to be billed to the user designated account. Although the merchant information processing system or the wireless computing device can be configured to submit pricing information to the billing entity, in one embodiment, both the wireless computing device and the merchant information processing system can submit the amount to be billed as an additional security check. In another embodiment, if the wireless computing device incorporates a short range wireless communications transceiver, data can be exchanged with the merchant information processing systems using short range wireless communications rather than bar codes and bar code readers.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. Within a wireless computing device, a method of conducting commerce comprising:

receiving a user input in the wireless computing device specifying an account to which a proposed transaction is to be billed and an amount for which authorization is being sought in connection with the account and proposed transaction;

identifying contact information for a billing entity according to the user specified account, wherein the billing entity manages the account;

sending an authorization request from the wireless computing device to the billing entity via a wireless communications link established between the wireless computing device and the billing entity using the contact information, wherein the authorization request identifies the requesting user, the amount to be approved for the transaction, as well as the account to be billed;

receiving by the wireless computing device an authorization from the billing entity via the wireless communications link, wherein the authorization specifies information including an identity of the requesting user, the account to be charged, the billing entity, and/or contact information for the billing entity;

dynamically encoding by the wireless computing device the billing entity and the authorization received from the billing entity into a pattern using a protocol compatible with a visual image reader of a point of sale (POS) system associated with a merchant processing system;

generating a bar code upon a display screen of the wireless computing device from the pattern;

presenting the display screen of the wireless computing device to the visual image reader at the POS system;

scanning the bar code using the visual image reader;

detecting the pattern in the bar code and retrieving the billing entity and the authorization encoded in the pattern;

verifying the retrieved authorization with the billing entity retrieved from the pattern;

the verification step further comprising the merchant processing system determining contact information of the billing entity retrieved from the bar code, the merchant processing system sending the retrieved authorization to the retrieved billing entity, and the merchant processing system receiving a response from the retrieved billing entity indicating whether the proposed transaction was authorized; and completing the transaction if the retrieved authorization is verified by the retrieved billing entity.

2. The method of claim 1, wherein the wireless communications link is a data communications link.

3. The method of claim 1, wherein the wireless communication link is a voice communications link, said requesting step comprising:

calling the billing entity; and requesting the authorization over the voice communications link.

4. The method of claim 1, wherein the bar code comprises at least one of numbers, characters, and symbols.

5. The method of claim 4, further comprising: identifying contact information for the retrieved billing entity.

6. Within a wireless computing device, a method of conducting commerce comprising:

receiving a user input in the wireless computing device specifying an account to which a proposed transaction is to be billed and an amount for which authorization is being sought in connection with the account and proposed transaction;

identifying contact information for a billing entity according to the user specified account, wherein the billing entity manages the account;

sending an authorization request from the wireless computing device to the billing entity via a first wireless communications link established between the wireless computing device and the billing entity using the contact information wherein the authorization request identifies the requesting user, the amount to be approved for the transaction, as well as the account to be billed;

receiving by the wireless computing device an the authorization from the billing entity via the first wireless communications link, wherein the authorization specifies information including an identity of the requesting user, the account to be charged, the billing entity, and/or contact information for the billing entity;

dynamically encoding by the wireless computing device the billing entity and the authorization received from the billing entity into a barcode pattern transmitting the barcode pattern through a second wireless communications link to a point of sale (POS) associated with a merchant processing system, wherein the second communications link is a short range wireless communication link established between said wireless computing device and said POS system;

detecting the pattern in the transmitted pattern and retrieving the billing entity and the authorization encoded in the transmitted pattern by the POS system;

verifying the retrieved authorization with the billing entity retrieved from the transmitted pattern, the verification step further comprising the merchant processing system determining contact information of the billing entity retrieved from the barcode pattern, the merchant processing system sending the retrieved authorization to the retrieved billing entity, and the merchant processing system receiving a response from the retrieved billing entity indicating whether the proposed transaction was authorized; and completing the transaction if the retrieved authorization is verified by the retrieved billing entity.

* * * * *